(12) United States Patent
Sengupta et al.

(10) Patent No.: US 6,558,450 B2
(45) Date of Patent: May 6, 2003

(54) METHOD FOR DEBUBBLING AN INK

(75) Inventors: Amitava Sengupta, Charlotte, NC (US); Daniel S. Huntsberger, Charlotte, NC (US); Brian D. Miller, Charlotte, NC (US)

(73) Assignee: Celgard Inc., Charlotte, NC (US)

( * ) Notice: Subject to any disclaimer, the term of this patent is extended or adjusted under 35 U.S.C. 154(b) by 0 days.

(21) Appl. No.: 09/816,730

(22) Filed: Mar. 22, 2001

(65) Prior Publication Data
US 2002/0134235 A1 Sep. 26, 2002

(51) Int. Cl.⁷ .......................... B01D 19/00; B01D 53/22
(52) U.S. Cl. ........................... 95/46; 96/6; 96/8
(58) Field of Search ................. 95/46; 96/6, 8, 96/10

(56) References Cited

U.S. PATENT DOCUMENTS

| | | | |
|---|---|---|---|
| 3,228,877 A | | 1/1966 | Mahon |
| 3,755,034 A | | 8/1973 | Mahon et al. |
| 4,220,535 A | | 9/1980 | Leonard |
| 4,421,529 A | * | 12/1983 | Revak et al. ............... 96/8 X |
| 4,664,681 A | | 5/1987 | Anazawa et al. |
| 4,707,267 A | * | 11/1987 | Johnson ..................... 96/8 X |
| 4,752,305 A | * | 6/1988 | Johnson ..................... 96/8 X |
| 4,788,556 A | * | 11/1988 | Hoisington et al. ......... 95/46 X |
| 4,869,732 A | * | 9/1989 | Kalfoglou ..................... 95/46 |
| 4,940,617 A | | 7/1990 | Baurmeister |
| 5,186,832 A | | 2/1993 | Mancusi et al. |
| 5,211,728 A | * | 5/1993 | Trimmer .................... 95/46 X |
| 5,254,143 A | * | 10/1993 | Anazawa et al. ............ 96/6 X |
| 5,264,171 A | | 11/1993 | Prasad et al. |
| 5,284,584 A | | 2/1994 | Huang et al. |
| 5,449,457 A | | 9/1995 | Prasad |
| 5,522,917 A | * | 6/1996 | Honda et al. ................ 95/46 |
| 5,695,545 A | * | 12/1997 | Cho et al. ................... 95/46 |
| 5,701,148 A | * | 12/1997 | Moynihan et al. .......... 95/46 X |
| 5,808,643 A | | 9/1998 | Tracy et al. |
| 6,059,405 A | | 5/2000 | Mochizuki et al. |
| 6,168,648 B1 | * | 1/2001 | Ootani et al. ............... 95/46 |

FOREIGN PATENT DOCUMENTS

| | | | | |
|---|---|---|---|---|
| EP | 1033162 | | 9/2000 | |
| EP | 1052011 | | 11/2000 | |
| JP | 58-219067 A | * | 12/1983 | ............ 96/6 |
| JP | 02-102714 A | * | 4/1990 | ............ 96/6 |
| JP | 02-107317 A | * | 4/1990 | ............ 96/6 |
| JP | 02-135117 A | * | 5/1990 | ............ 96/6 |
| JP | 02-290201 A | * | 11/1990 | ........... 95/46 |
| JP | 03-080983 A | * | 4/1991 | ............ 96/6 |
| JP | 03-109904 A | * | 5/1991 | ............ 96/6 |
| JP | 03-118802 A | * | 5/1991 | ........... 95/46 |
| JP | 04-007003 A | * | 1/1992 | ........... 95/46 |
| JP | 05-017712 | | 1/1993 | |
| JP | 06-134446 A | * | 5/1994 | ............ 96/6 |
| JP | 06-327905 A | * | 11/1994 | ............ 96/6 |
| JP | 10-060339 | | 3/1998 | |
| JP | 10-298470 | | 11/1998 | |

* cited by examiner

Primary Examiner—Robert H. Spitzer
(74) Attorney, Agent, or Firm—Robert H. Hammer, III

(57) ABSTRACT

The present invention is directed to a method for debubbling an ink. The method comprises the steps of: providing an ink having an entrained gas; providing a membrane contactor comprising a plurality of integrally asymmetric hollow fiber microporous membranes; a membrane defining within the contactor a lumen side and a shell side; providing a vacuum source; passing the gas entrained ink through the shell side of the contactor; applying the vacuum source to the lumen side of the contactor; and debubbling the gas entrained ink across the membrane.

10 Claims, 3 Drawing Sheets

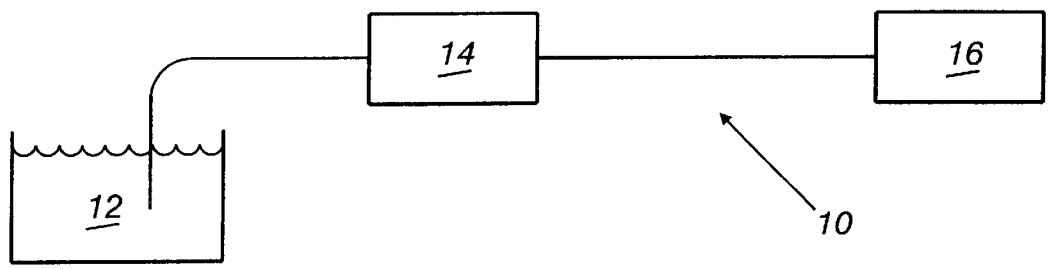
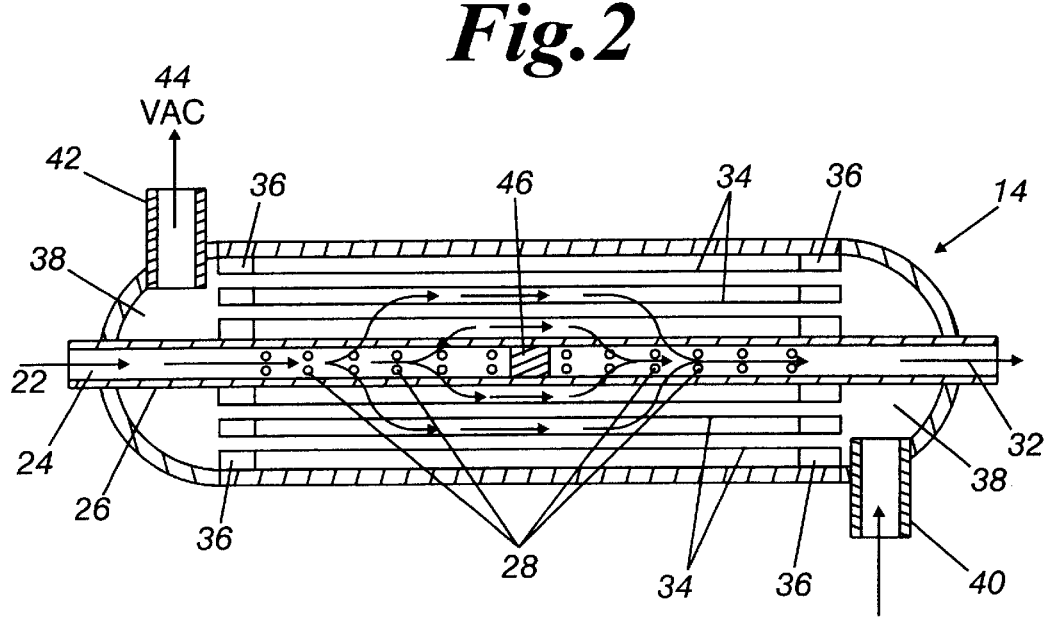

METHOD FOR DEBUBBLING AN INK

FIELD OF THE INVENTION

This invention is directed to a method of debubbling an ink by using a membrane contactor.

BACKGROUND OF THE INVENTION

It is known to use hollow fiber membrane contactors to degas liquids. See, for example, the LIQUI-CEL® Semi-Per™ membrane contactor commercially available from Celgard Inc. of Charlotte, N.C. This contactor utilizes a homogeneous, nonskinned, symmetric, polypropylene microporous hollow fiber membrane coated with a fluoropolymer and has been used to remove gases from photoresist developer solutions, lithographic printing plate solutions, and photographic film and paper emulsions. In this contactor, the foregoing liquids flow over the exterior surfaces of the hollow fibers.

Inks, for example, inks for ink jet printers, are sensitive to bubble formation. Formation of the bubbles, as the ink is discharged, can be detrimental to, among other things, quality printing applications or cartridge filling operations. See, for example, European Publication 1,033,163, Paragraph 0014, which is incorporated herein by reference.

Several membrane-based solutions have been proposed for bubble-in-ink problems. See, for example, Japanese Kokai's 517712; 10-60339; 10-298470; European Publications 1,033,162; 1,052,011; and U.S. Pat. No. 6,059,405. Also, please note European Publication 1,033,162, Paragraph 0007 which categorizes additional techniques for removing dissolved gases from chemical liquids by use of a membrane.

Japanese Kokai 5-17712 discloses the use of membranes made from polyethylene, polypropylene, poly(tetrafluoroethylene), polystyrene, or polymethyl methacrylate resins (Paragraph 0008), and the ink flows on the lumen side of the membrane (Paragraph 0007).

Japanese Kokai 10-60339 discloses the use of membranes made from a fluororesin (claim 2), and the ink flows on the lumen side of the membrane (abstract).

Japanese Kokai 10-298470 (and its related case European Publication 1,052,011) discloses the use of composite (or conjugate or multi-layered) membranes with porous and nonporous layers, and suggests, among other things, the use of polymethylpentene (or PMP or poly(4-methylpentene-1)) (Paragraphs 0018–0020), and the ink flows on the lumen side of the membrane (abstract).

European Publication 1,033,162 discloses the use of composite membranes, with porous and nonporous layers and suggests, among other things, the use of PMP (Paragraphs 0026 and 0048) for both layers, and the ink flows on the lumen side of the membrane (Paragraph 0054).

U.S. Pat. No. 6,059,405 discloses the use of a membrane, a hollow fiber membrane, and the ink flows on the lumen side of the membrane (column 3, lines 55–65).

While each of the foregoing had a measured success in accomplishing the debubbling goal, there is still a need for a method of removing entrained gases from inks in a simple and cost effective manner.

SUMMARY OF THE INVENTION

The present invention is directed to a method for debubbling (or degassing) an ink. The method comprises the steps of: providing an ink having an entrained gas; providing a membrane contactor comprising a plurality of integrally asymmetric hollow fiber microporous membranes; a membrane defining within the contactor a lumen side and a shell side; providing a vacuum source; passing the gas entrained ink through the shell side of the contactor; applying the vacuum source to the lumen side of the contactor; and debubbling the gas entrained ink across the membrane.

DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is a schematic illustration of an ink debubbling system.

FIG. 2 is a schematic illustration of the first embodiment of a membrane contactor made according to the instant invention.

DETAILED DESCRIPTION OF THE INVENTION

Figure 3:
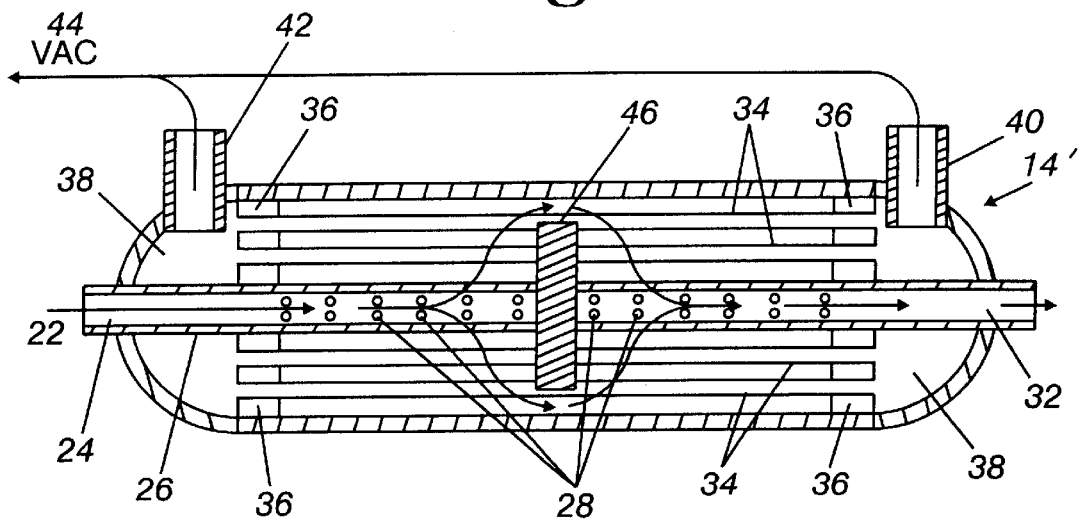
FIG. 3 is a schematic illustration of a second embodiment of the membrane contactor.

Referring to the drawings wherein like numerals indicate like elements, there is shown in FIG. 1 an ink debubbling system 10. Ink debubbling system 10 comprises an ink reservoir 12. A membrane contactor 14 is in fluid communication with the reservoir 12. An end use application 16 is in fluid communication with membrane contactor 14. End use application may be, but is not limited to, an ink jet printing head (thermal or piezoelectric), an ink cartridge filling station, or the like.

Ink, as used herein, is a fluid containing pigments or dyes. Inks, preferably, have a surface tension less than water at room temperature (i.e., about 72.75 dynes/cm at 20° C. and 71.20 dynes/cm at 30° C.). These inks are, preferably, used in computer printers or other ink jet type printers. Such inks, preferably, have a viscosity of 0.8 to 10 centipoises (CPS), a specific gravity of 0.7 to 1.5 grams per milliliter (g/ml), and a surface tension of 20 to 40 dynes per centimeter (dynes/cm).

The membrane contactor 14, which is discussed in greater detail below, is an external flow, hollow fiber membrane module. Hollow fiber membrane contactors are known. For example see: U.S. Pat. Nos. 3,228,877; 3,755,034; 4,220,535; 4,940,617; 5,186,832; 5,264,171; 5,284,584; 5,449,457, each is incorporated herein by reference. The membrane contactor 14 has a lumen side and a shell side. The lumen side, also known as the internal side, is defined, in large part, by the lumen of the hollow fiber. The shell side, also known as the external side, is defined, in part, by the external surface of the hollow fiber. The ink travels through the shell (or external) side, while the vacuum (or vacuum and sweep gas) is applied to the lumen (or internal) side. Thereby, entrained gases from the ink pass from the shell side through the membrane to the lumen side. The contactor 14 is made of components that are inert to or non-reactive with the ink (or other liquid). Preferably, these components are plastic, but metals may be used.

The membrane is preferably a semi-permeable, gas selective, heterogeneous, integrally asymmetric, and liquid impermeable membrane. The membrane has a permeability of less than 100 Barrers ($10^{-8}$ standard $cm^3.cm/sec.cm^2.cm$ (Hg)). The membrane preferably has an active surface area of 0.1 to 20 meters$^2$. The membrane is, preferably, a skinned membrane and the skin is on the shell side. The membrane is, preferably, a single layer membrane (e.g., not a composite or multi-layered membrane) and is made from a homopolymer of polymethylpentene. For example, see U.S. Pat. No. 4,664,681, incorporated herein by reference.

Referring to FIG. 2, ink 22 enters contactor 14 via ink inlet 24 of core tube 26. Core tube 26 includes a perforated 28 area immediately ahead of block 30. Ink 22 travels through the inlet 24 of core tube 26 and exits tube 26 via perforations 28 when it is diverted by block 30. Ink 22 then travels over the exterior surfaces of hollow fibers 34. Ink 22 re-enters core tube 26 via perforations 28 on the other side of block 30 and exits tube 26 via ink outlet 32. The hollow fibers 34 surround core tube 26 and are maintained generally parallel to tube 26's axis via tube sheets 36. Hollow fibers 34 extend through tube sheet 36 and are in communication with headspaces 38 on either end of contactor 14, so that vacuum 44 drawn at ports 40 and 42 is in communication with the lumen side via headspaces 38. Port 40, for example, may also be used to introduce a sweep gas, which facilitates entrained gas removal.

Referring to FIG. 3, contactor 14' is the same as shown in FIG. 2 but for a flow diverting baffle 46 located within the shell side, and port 40 has been moved. The baffle 46 is added to promote distribution of ink over all exterior surfaces of the hollow fibers 34. Port 40 is moved to illustrate the non-criticality of port location.

Figure 4:
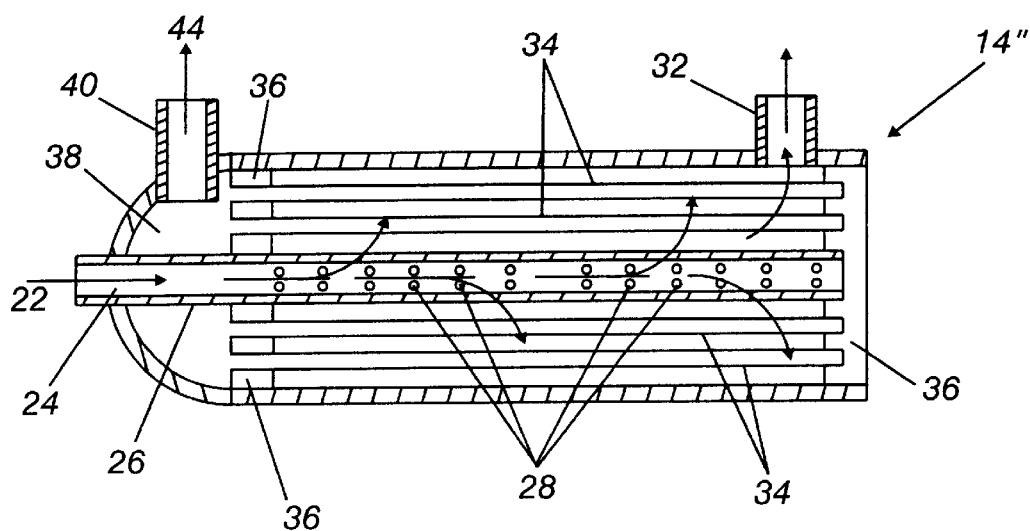
FIG. 4 is a schematic illustration of a third embodiment of the membrane contactor.

Referring to FIG. 4, contactor 14" differs from contactors 14 and 14' by moving ink outlet 32 from the terminal end of core tube 26 to the contactor shell, as illustrated. Vacuum 44 is in communication with headspace 38 which, in turn, is in communication with the lumens of hollow fibers 34. The second headspace illustrated in the previous embodiments has been eliminated. Ink 22 enters ink inlet 24 of core tube 26. Ink 22 exits tube 26 via perforations 28, travels over the exterior surfaces of hollow fibers 34, and exits the shell side via outlet 32. Outlet 32 may be placed at other locations on the exterior of the contactor so that it maintains communication with the shell side.

Figure 5:
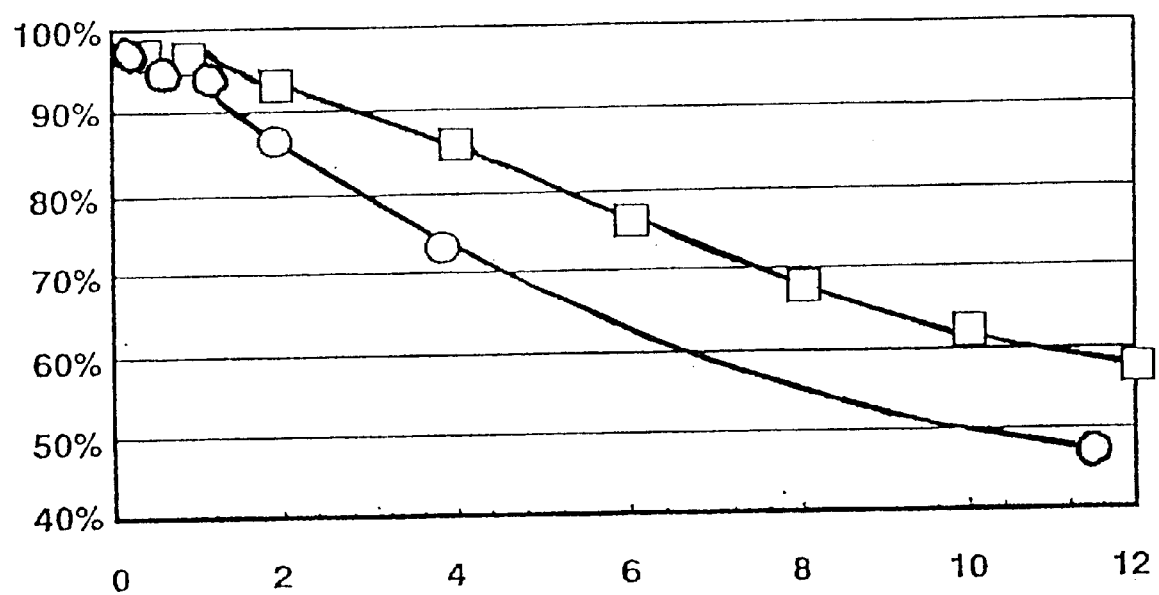
FIG. 5 is a graph illustrating the performance of the CELGARD SemiPer contactor to the instant invention.

In operation, entrained gases, which form bubbles, are removed from the ink by a concentration difference across the membrane, that is by diffusion. Vacuum, ranging from 25 to 200 torr, is placed on lumen side of the membrane, and the gas entrained ink is in contact with the shell side (or exterior surface) of the membrane. The concentration (partial pressure of the gas) difference drives the gas from the ink on the shell side, through the membrane to the lumen side. Furthermore, by routing the ink through the shell (or exterior) side, versus the lumen side, the pressure drop of the ink through the contactor is greatly reduced. This is because passage through the lumens provides a much greater resistance to flow than the shell side space. In FIG. 5, the performance of a contactor according to the present invention is compared to CELGARD's SemiPer contactor. The graph illustrates 'Dissolved Oxygen (DO) Removal Efficiency' (%) as a function of water flow rate (liters/minute) at 20° C. and 35 torr of vacuum. Water was used, instead of ink, but contactor performance is deemed analogous to the foregoing inks at the stated conditions. The upper curve represents performance of the instant invention (2.5" diameter), and the lower curve represents performace of the SemiPer contactor (2.5" diameter).

The present invention may be embodied in other specific forms without departing from the spirit or essential attributes thereof, and, accordingly, reference should be made to the appended claims, rather than to the foregoing specification, as indicating the scope of the invention.

That which is claimed:

1. A method for debubbling an ink comprising the steps of:

providing an ink having a gas entrained therein;

providing a membrane contactor comprising a plurality of single layered, skinned, polymethylpentene hollow fiber microporous membranes, the membrane defining within the contactor a lumen side and a shell side and the skin being on the shell side;

providing a vacuum;

passing the gas entrained ink through the shell side of the contactor;

applying the vacuum to the lumen side of the contactor; and debubbling the gas entrained ink across the membrane.

2. The method of claim 1 wherein the ink has a surface tension less than the surface tension of water at room temperature.

3. The method of claim 1 wherein the ink has a viscosity of 0.8 to 10 centipoises, a specific gravity of 0.7 to 1.5 grams per milliliter, and a surface tension of 20 to 40 dynes per centimeter.

4. The method of claim 1 wherein the membrane has an active surface area of 0.1 to 20 meters$^2$.

5. The method of claim 1 wherein the membrane has a permeability of less than 100 Barrers.

6. The method of claim 1 wherein the membrane is a semi-permeable, gas selective, heterogeneous, liquid impermeable membrane.

7. The method of claim 1 wherein polymethylpentene being a homopolymer.

8. The method of claim 1 wherein the module includes a baffle.

9. The method of claim 1 wherein the vacuum ranges from 25 to 200 torr.

10. A method for debubbling an ink comprising the steps of:

providing an ink having a gas entrained therein, the ink having a viscosity of 0.8 to 10 centipoises, a specific gravity of 0.7 to 1.5 grams per milliliter, and a surface tension of 20 to 40 dynes per centimeter;

providing a membrane contactor comprising a plurality of single layered, skinned, polymethylpentene hollow fiber microporous membranes, the membrane defining within the contactor a lumen side and a shell side and the skin being on the shell side, the membrane having an active surface area of 0.1 to 20 meters$^2$;

providing a vacuum, the vacuum ranging from 25 to 200 torr;

passing the gas entrained ink through the shell side of the contactor;

applying the vacuum to the lumen side of the contactor; and debubbling the gas entrained ink across the membrane.

\* \* \* \* \*